(12) United States Patent
Sakaguchi et al.

(10) Patent No.: US 6,986,138 B1
(45) Date of Patent: Jan. 10, 2006

(54) VIRTUAL WORK FLOW MANAGEMENT METHOD

(75) Inventors: Toshiaki Sakaguchi, Kawasaki (JP); Shunsuke Akifuji, Wako (JP); Masato Tamaki, Zushi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/544,283

(22) Filed: Apr. 6, 2000

(30) Foreign Application Priority Data

Apr. 8, 1999 (JP) .......................................... 11-100980

(51) Int. Cl.
*G06F 9/46* (2006.01)

(52) U.S. Cl. ...................... 718/105; 709/201; 709/202; 709/203; 705/7

(58) Field of Classification Search ................. 718/105; 709/203, 202, 201, 105; 705/7
See application file for complete search history.

(56) References Cited

U.S. PATENT DOCUMENTS

| | | | | |
|---|---|---|---|---|
| 6,067,548 A | * | 5/2000 | Cheng ..................... | 707/103 R |
| 6,279,009 B1 | * | 8/2001 | Smirnov et al. ........ | 707/103 R |
| 6,321,133 B1 | * | 11/2001 | Smirnov et al. ............ | 700/100 |

FOREIGN PATENT DOCUMENTS

| | | |
|---|---|---|
| JP | 8-123744 | 5/1996 |
| JP | 8-221476 | 8/1996 |
| JP | 9-204467 | 8/1997 |

OTHER PUBLICATIONS

Kumar, Akhil et al. "Dynamic routing and operational controls in workflow management systems", Feb. 1999, Management Science, vol. 45, Issue 2; p. 253 (20 pages).*
Feng, Shaw C. et al. "A modular architecture for rapid development of CAPP systems for agile manufacturing" Oct. 1998, IIE Transactions, vol. 30, issue 10; p. 893 (11 pages).*
Schwartz, Jeffrey "Workflow Manager—Percussion Software makes life with Note easier", Jul. 29, 1996, CommunicationsWeek, p. 12.*

* cited by examiner

*Primary Examiner*—Anthony Knight
*Assistant Examiner*—Thomas Pham
(74) *Attorney, Agent, or Firm*—Mattingly, Stanger, Malur & Brundidge, PC

(57) ABSTRACT

A processing node is selected from an actual workflow definition composed of the corresponding processing nodes to an actual service flow according to the purpose of use of a client. A virtual workflow definition composed of the virtual node corresponding to the selected processing node is created by a server and displayed on a screen of the client. A link is set for indicating correspondence between the virtual node of the virtual workflow and the processing node of the actual workflow. When an inquiry about the progressing state of the virtual workflow is given from a client, the server searches the processing node being current executed from the actual workflow. If the processing node does not have any link, the server tracks back the processing nodes on the actual workflow for searching the processing node having the link and an access right given from the client and then reply the progressing state of the processing node as the progress information of the virtual workflow to the client.

11 Claims, 14 Drawing Sheets

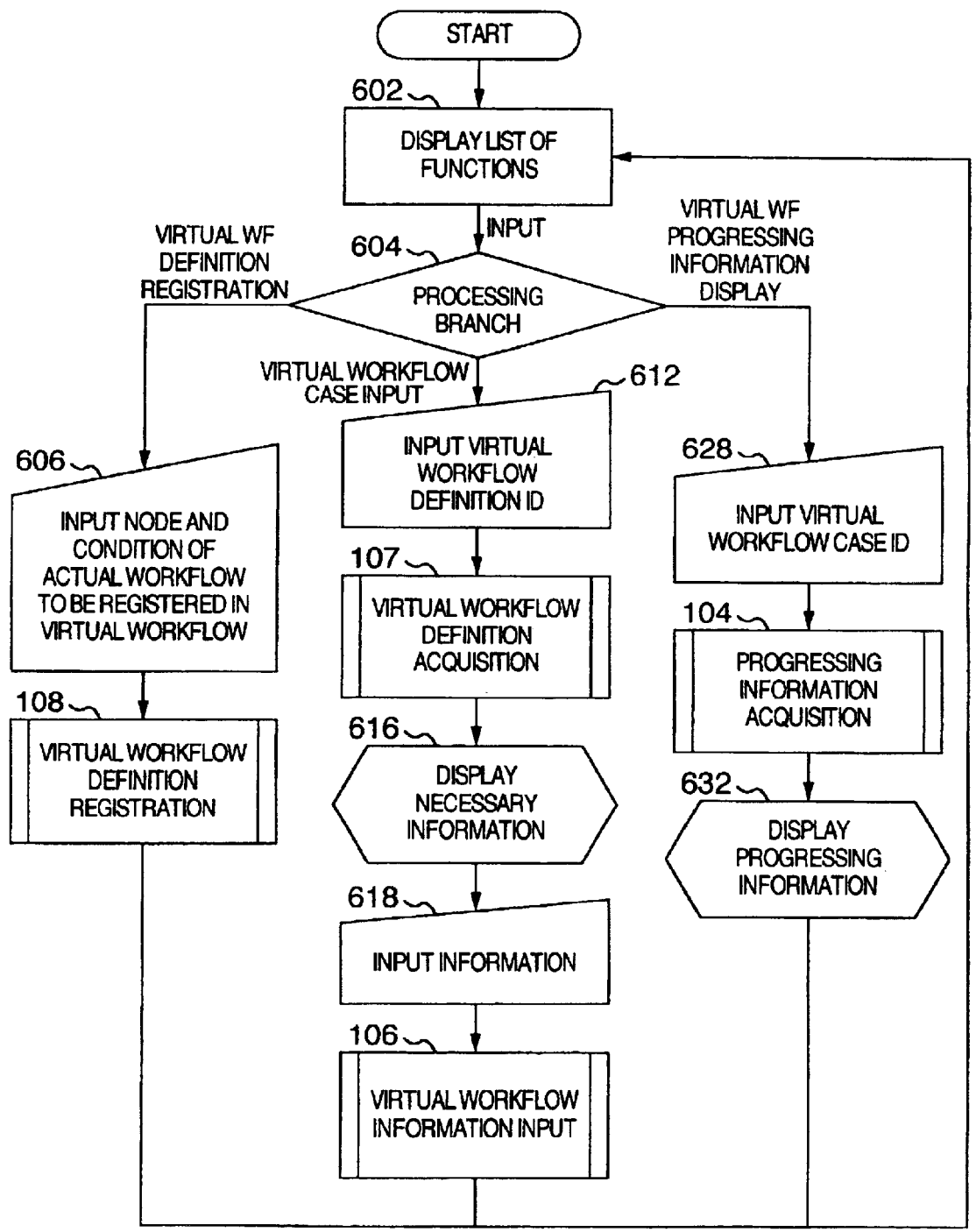

| USER ID | VIRTUAL WF DEFINITION ID |
|---|---|
| USER0001 | 1001 |
| USER0002 | 1002 |
|  |  |

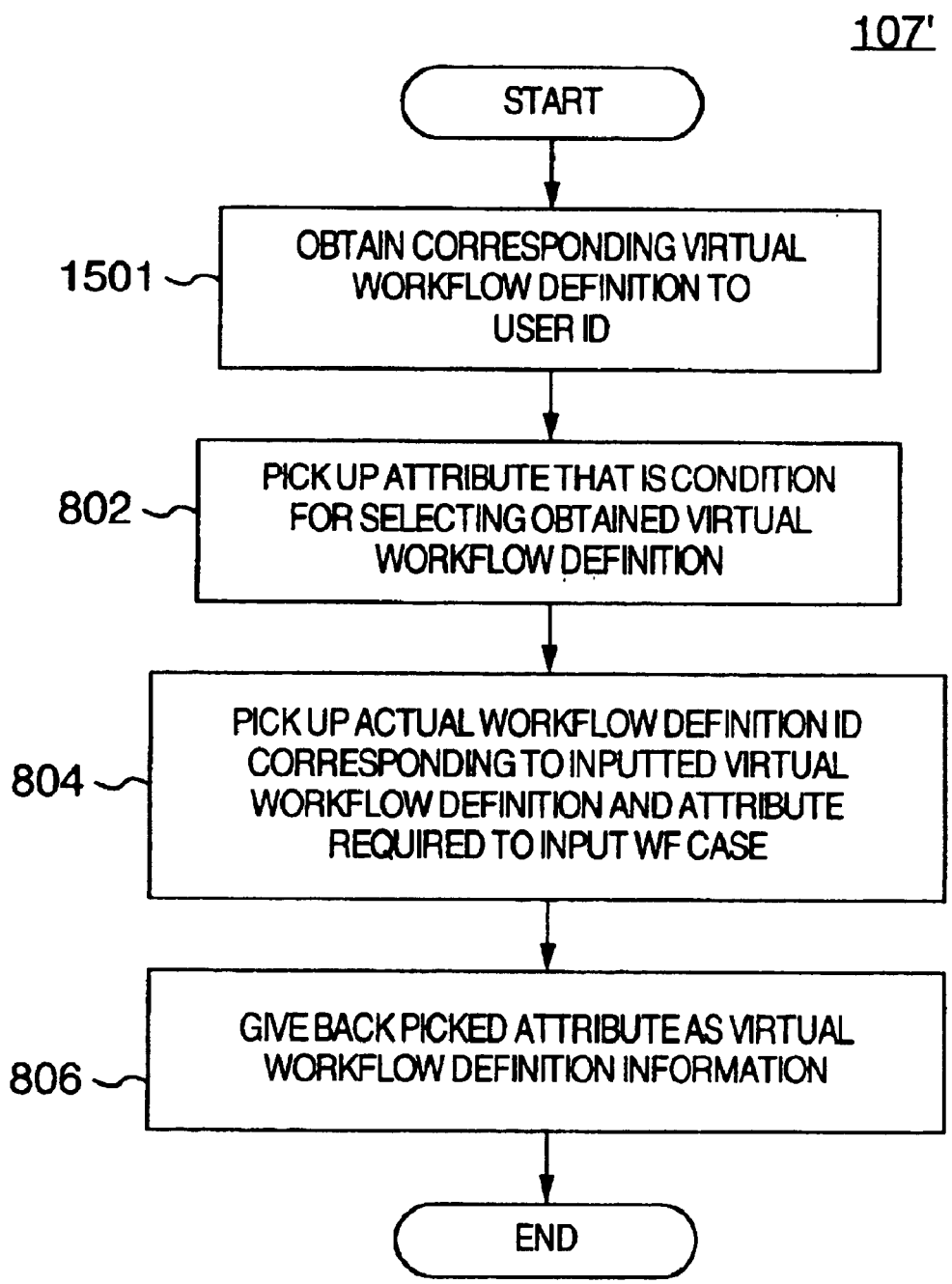

VIRTUAL WORK FLOW MANAGEMENT METHOD

BACKGROUND OF THE INVENTION

The present invention relates to a workflow system for managing an overall work through the use of a plurality of workflow definitions.

A representative example of a conventional workflow system arranged to utilize a plurality of workflow definitions is described in JP-A-8-123744. This workflow system implements the association or the serial association of workflows by combining a plurality of workflow definitions in a hierarchical or serial manner. This workflow system is arranged to provide an inlet and an outlet for the workflow definition and linking the inlet of one workflow definition with the outlet of another workflow definition. This system therefore enables to manage the workflow definition across two or more sections independently in each section.

Further, another example of the workflow system provided with means for grasping the progressing state of the flow being executed in the outside workflow system such as another organization is described in JP-A-8-221476. This workflow system is capable of easily grasping the progressing state of the workflow being executed in another organization to which workflow the execution information is sent from the self-organization. This workflow system is arranged so that a workflow server having received the workflow case notifies a workflow inter-server managing unit for recording and managing the workflow being executed of the receipt of the information and the workflow inter-server managing unit can keep trace of the workflow case having being set to another workflow server, grasp the progressing state of the execution, and report it to the workflow server having received the workflow case in response to the request for grasping the progressing state.

Moreover, another example of the workflow system arranged to be associated with another workflow managing system so that the details of the progressing state cannot be grasped by another workflow managing system is described in JP-A-9-204467. This workflow system is arranged to describe an activity of a flow of series applications associated with plural persons in a workflow, present a collection of plural activities as one outside activity according to the other party so that the details of the progressing state and the workflow arrangement may not be leaked outside.

However, the foregoing background arts have the problems to be discussed below.

At first, the workflow managing system described in JP-A-8-123744 is arranged to transfer a workflow case from one organization to another one or vice versa. In the case of greatly changing the workflow definition such as remodeling of one organization, another organization is required to change the workflow definition to be associated with the remodeled organization, resulting in increasing the number of the maintaining steps of the workflow.

Second, the workflow managing system has difficulty in disclosing the necessary information to an outside domain as keeping the exact progressing information. In the case of grasping the progress of a case in the combination of the workflow managing system described in JP-A-8-123744 and the workflow system described in JP-A8-221476, the sections to be associated may be transparent to the outside. Hence, if the domain of the other party is located outside of the company, the information inside of the company may be leaked outside. This is unfavorable to the security. In this respect, the workflow managing system described in JP-A-9-204467 is arranged to restrict the disclosure of the information by presenting a collection of activities as one activity. However, the presentation of the collection of activities results in concealing the information of the progress, which makes it possible to exactly grasp the progressing state from the outside.

Third, in the case of receiving the same case from other domains, the workflow definition of one domain may be different from that of another domain according to the type of the service. For example, the workflow managing system described in JP-A-8-123744 is required so that each sender domain may specify the corresponding workflow definition to each service. Hence, this system needs to do a troublesome work in notifying the sender domains of the workflow definition for each service.

Fourth, in the case of managing the work for executing a plurality of workflows, the foregoing systems have difficulty in describing a workflow to be managed merely by a routine work to be described by the workflow definition. That is, the background arts allow an operator to manage each workflow in the case of inputting and managing plural individual workflow cases in the service to be done by the workflow system. Further, if the cases are related to each other, the background arts provide a capability of managing the progress of series services by associatively connecting the workflow definitions corresponding to the cases as described in JP-A-8-123744. However, if the relevance between the workflow cases is variable, the background arts are incapable of constantly connecting the workflow definitions with each other, thereby being unable to continuously managing the progress of the series services, which imposes a restriction on the service to be described by the workflow definition.

SUMMARY OF THE INVENTION

It is an object of the present invention to provide a method for managing a workflow which provides a capability of concealing the unnecessary change of information from the user side of the system or allows the change to be transparent to the user side of the system.

It is a further object of the present invention to provide a method for managing a workflow which provides a capability of restricting the increase of the maintaining steps caused by the revision of the workflow definition.

It is a yet further object of the present invention to provide a method for managing a workflow which provides a capability of obtaining exact progressing information from an outside domain within the minimum range of disclosure.

It is another object of the present invention to provide a method for managing a workflow which provides a capability of reducing the number of workflow definitions requested from the outside even if the number of the services of one workflow is increased.

It is another object of the present invention to provide a method for managing a workflow which provides a capability of managing a progress of series of services across two or more workflows even in the service in which a plurality of individual workflow cases are used.

In carrying out the object, the present invention introduces the concept of the virtual workflow and provides means for realizing the virtual workflow.

Herein, the definition of a service procedure in the actual system for managing a workflow is called an actual workflow definition. The information generated as each case based on the actual workflow definition is called actual workflow case. The virtual workflow is a workflow composed of a selected one of the service procedures in the actual workflow. Further, the virtual workflow is arranged to simply and clearly show a workflow according to the purpose of each user though the actual workflow is complicated. Hence, the virtual workflow does not request the name of each node to be equal to the name of the node used in the actual workflow and enables to define the workflow by using the title according to the purpose of the use.

Concretely, the virtual workflow definition is a definition of a flow of a service to be composed of part of nodes composing the actual workflow definition. The virtual workflow case is the information to be generated as each case on the basis of the virtual workflow definition.

The method for managing the virtual workflow according to the invention includes a step of specifying a node to be disclosed to the user among the nodes composing the actual workflow and setting a right of operation to the user and a step of registering the node to be disclosed as the virtual workflow definition for connecting the nodes with each other according to the registering sequence of the table.

Further, one virtual workflow definition attribute may be defined in the virtual workflow definition so that one virtual workflow definition may correspond to another actual workflow definition according to the user's desire. The managing method includes a step of determining the actual workflow definition corresponding to the virtual workflow definition by using the defined attribute and a step of registering the virtual workflow case by inputting the actual workflow case with the determined actual workflow definition.

In order to minimally grasp the progressing state from the virtual workflow, the method for managing a virtual workflow includes a step of acquiring the actual workflow case corresponding to the specified virtual workflow, a step of specifying a node being currently processed in the corresponding actual workflow, and a step of comparing the specified node (specified node) with a node (disclosed node) of the actual workflow definition disclosed as the node of the virtual workflow definition and making the progressing state of the disclosed node matched to the specified node or located before the specified node and closest to one and giving an access right to the user the progressing state of the virtual workflow definition.

In order to flexibly configure the virtual workflow system, the configuration for managing the virtual workflow includes means for storing virtual workflow definition information having ID information of the virtual workflow, ID information of each node included in the virtual workflow definition, and information on a right of operation of a user and means for storing workflow link definition information containing ID information of each node of the virtual workflow definition, ID information of the actual workflow definition, and a link ID for indicating a link between the node of the virtual workflow definition and the corresponding node of the actual workflow definition.

According to the invention, through the use of the virtual workflow definition, in the case of transferring the workflow with an outside company, no association is executed directly by using the actual workflow definition. It is thus necessary to reduce the number of the maintenance steps without having to notify the outside of the change if the internal procedure is changed.

According to the invention, by linking only the node of the actual workflow definition required for the progress information with the node of the virtual workflow definition, it is possible to notify the other party of the necessary progressing information as protecting the procedure information inside of the company from being leaked out to the other party.

According to the invention, since two or more actual workflow definitions are represented by one virtual workflow definition, only one virtual workflow definition is required even if the procedure is different according to each company or a type of a matter to be treated, thereby reducing the number of the workflow definitions to be managed.

According to the invention, since one actual workflow definition may be virtually viewed as a plurality of virtual workflow definitions, the way of view may be changed according to the user of the virtual workflow system. This makes it possible to provide the necessary workflow information according to the user's need.

BRIEF DESCRIPTION OF THE DRAWINGS

FIG. 6 is a flowchart showing a process of a user interface in the embodiment shown in FIG. 1;

FIG. 15 is a flowchart showing a process of obtaining the definition information in the definition of the virtual workflow shown in FIG. 13A.

DESCRIPTION OF THE EMBODIMENTS

Hereafter, one embodiment of the present invention will be described in detail with reference to the appended drawings.

(Example of Virtual Workflow Definition)

At first, the description will be oriented to an example of the virtual workflow definition.

Figure 2:
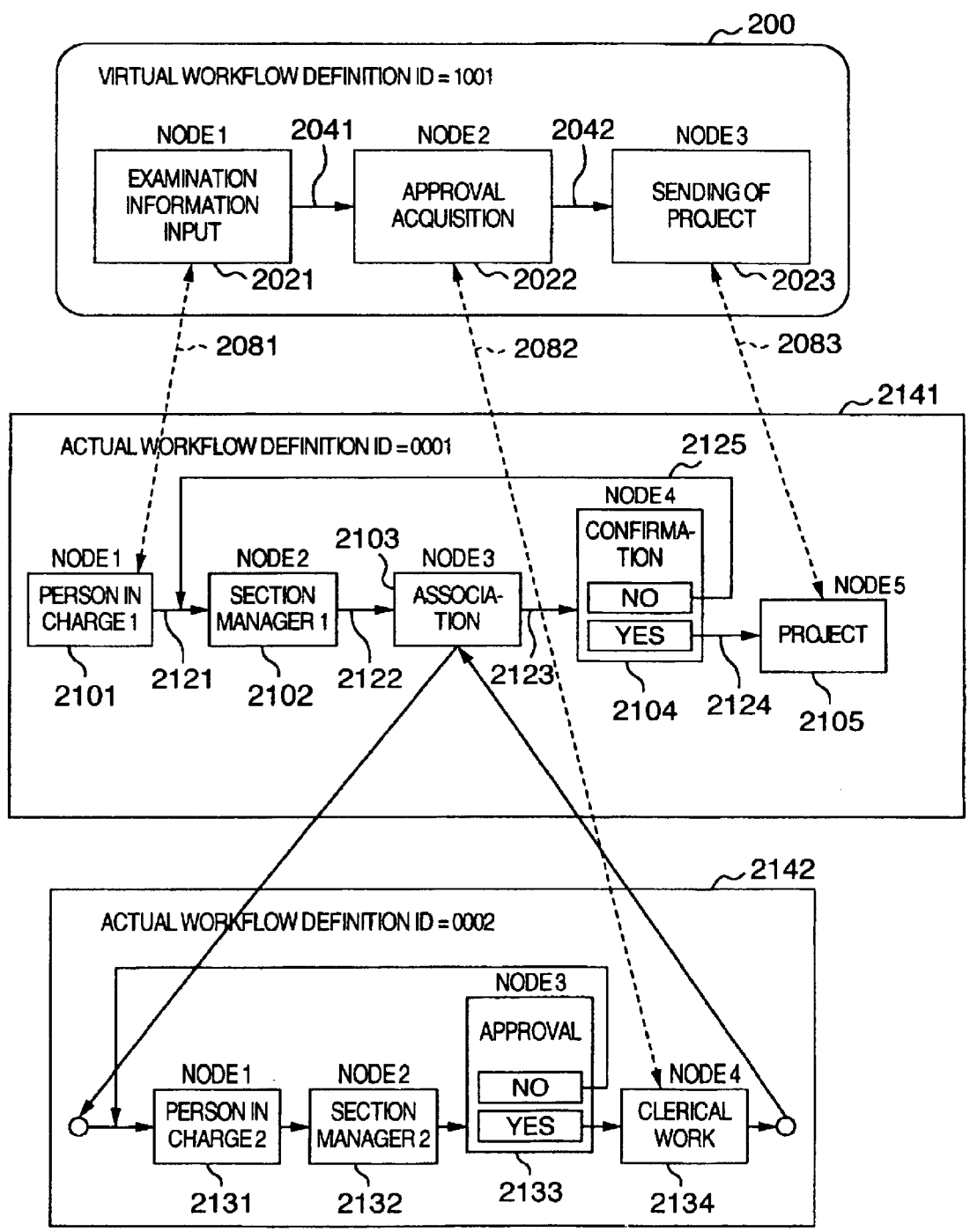
FIG. 2 is a schematic diagram showing an example of a workflow definition in the embodiment shown in FIG. 1.

FIG. 2 shows an example of a virtual workflow definition and an actual workflow definition used in the embodiment.

As shown in FIG. 2, a virtual workflow definition 200 is intended for a user and is composed of virtual workflow nodes 2021 to 2023, arcs 2041 and 2042, and definition links 2081 and 2082 (to be connected with actual workflow definitions 2141 and 2142). Each of the virtual workflow nodes 2021 to 2023 represents one step in the virtual workflow definition 200. The arcs 2041 and 2042 serve to connect the node 2021 with the other node 2022 and the node 2022 with the other node 2023, respectively. The process at each step proceeds toward the arrow of each of the arcs 2041 and 2042.

The actual workflow definition 2141 is composed of actual workflow nodes 2101 to 2105 and real arcs 2121 to 2125. Likewise, the actual workflow definition 2142 is composed of actual workflow nodes 2131 to 2134 and arcs. The work title of the workflow is allocated to each of the actual workflow nodes 2101 to 2105 and 2131 to 2134. Like the "person in charge 1" as shown in FIG. 2, the name of the worker for doing the process may be allocated to the node.

Further, through the use of the definition links 2081 to 2083, the states of the actual workflow nodes 2101, 2134 and 2105 such as information about start and end of a process and execution of judgement are made to correspond to the virtual workflow nodes 2021 to 2023, respectively.

Like the actual workflow node, the approximate name to the purpose of use may be allocated to each of the virtual workflow nodes 2021 to 2023. That is, the names of the virtual workflow nodes may be determined independently of the names of the actual workflow nodes 2101, 2134 and 2105 being matched thereto by the definition links.

The virtual workflow definition 200 may be related with a plurality of actual workflow definitions (for example, 2141 and 2142) through the definition link. In the embodiment shown in FIG. 2, the three nodes of the "person in charge 1" 2101, the "clerical work" 2134, and the "project" 2105 are represented by one virtual workflow definition 200.

(Configuration of Function Block)

Figure 1:
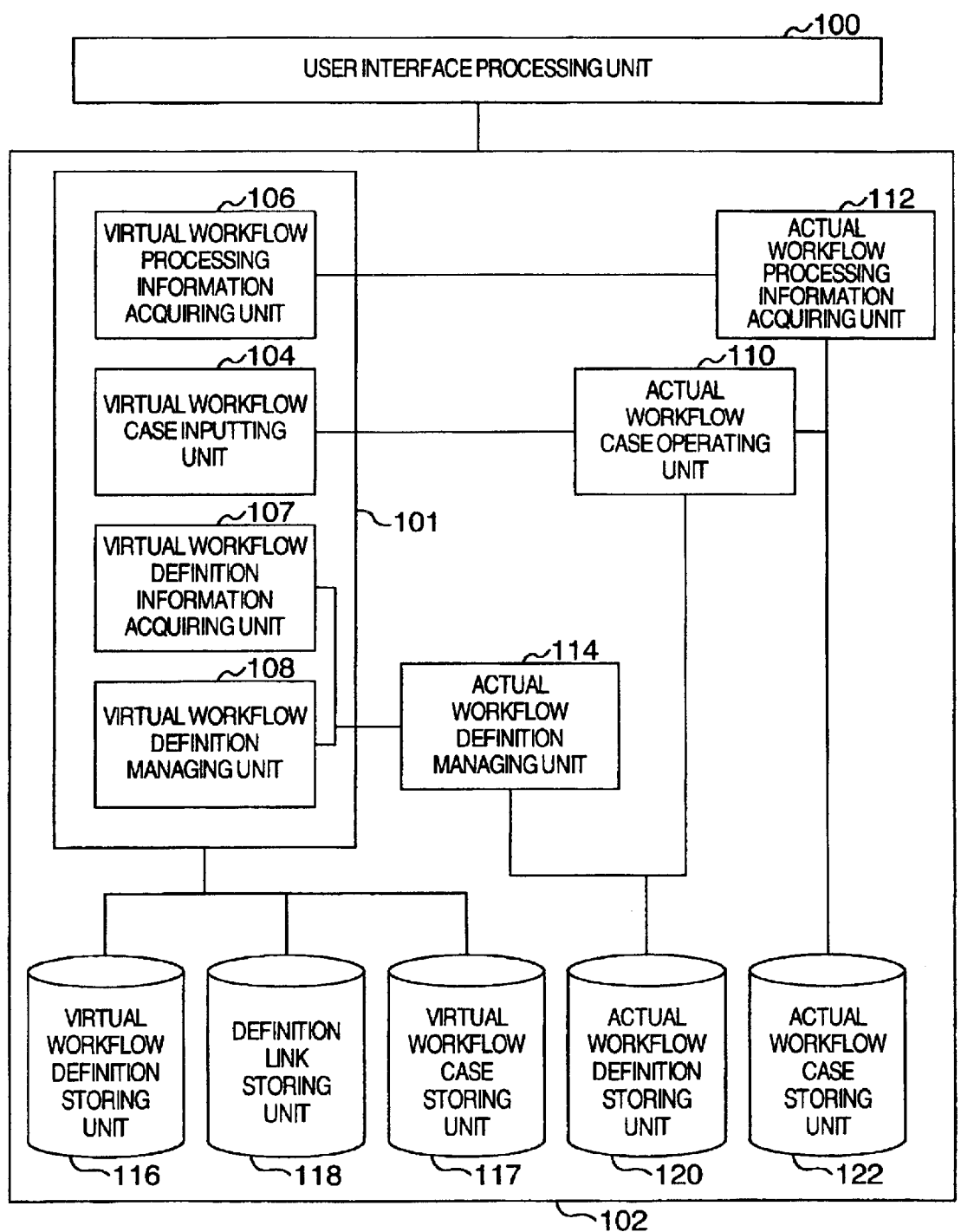
FIG. 1 is a schematic diagram showing a workflow system according to an embodiment of the present invention.

FIG. 1 is a function block diagram showing a method for managing a virtual workflow according to an embodiment of the present invention.

A numeral 100 denotes a user interface processing unit, which operates to invoke a virtual workflow processing unit 101 included in a virtual workflow system 102. The virtual workflow processing unit 101 is composed of a virtual workflow case inputting unit 104, a virtual workflow progress information acquiring unit 106, a virtual workflow definition information acquiring unit 107, and a virtual workflow definition managing unit 108, each of which operates to input information for execution of the virtual workflow, acquire the progressing state of the virtual workflow, acquire information about the virtual workflow definition, and register the virtual workflow definition in the describing sequence.

The virtual workflow case inputting unit 104 operates to access the information stored in a virtual workflow definition storing unit 116 and a definition link storing unit 118. Further, the inputting unit 104 operates to update a virtual workflow case stored in the virtual workflow case storing unit 117 and the actual workflow case stored in the actual workflow case storing unit 122 through the use of the actual workflow case operating unit 110.

The virtual workflow progress information acquiring unit 106 operates to access the information stored in a virtual workflow definition storing unit 116, a definition link storing unit 118, and a virtual workflow case storing unit 117. Further, the acquiring unit 106 operates to access the progress information of the actual workflow from the workflow case storing unit 122 by using the actual workflow progress information acquiring unit 112 and then acquire the progress information of the virtual workflow on the basis of the progress information.

The virtual workflow definition information acquiring unit 107 operates to access the workflow definition information stored in an actual workflow definition storing unit 120 through an actual workflow definition managing unit 114. It further operates to access the information stored in the virtual workflow definition storing unit 116 for acquiring the information about the virtual workflow definition.

The virtual workflow definition managing unit 108 operates to access the workflow definition information stored in the actual workflow definition storing unit 120 through the actual workflow definition managing unit 114 and then update the virtual workflow definition information stored in the virtual workflow definition storing unit 116 and the definition link storing unit 118.

Figure 11:
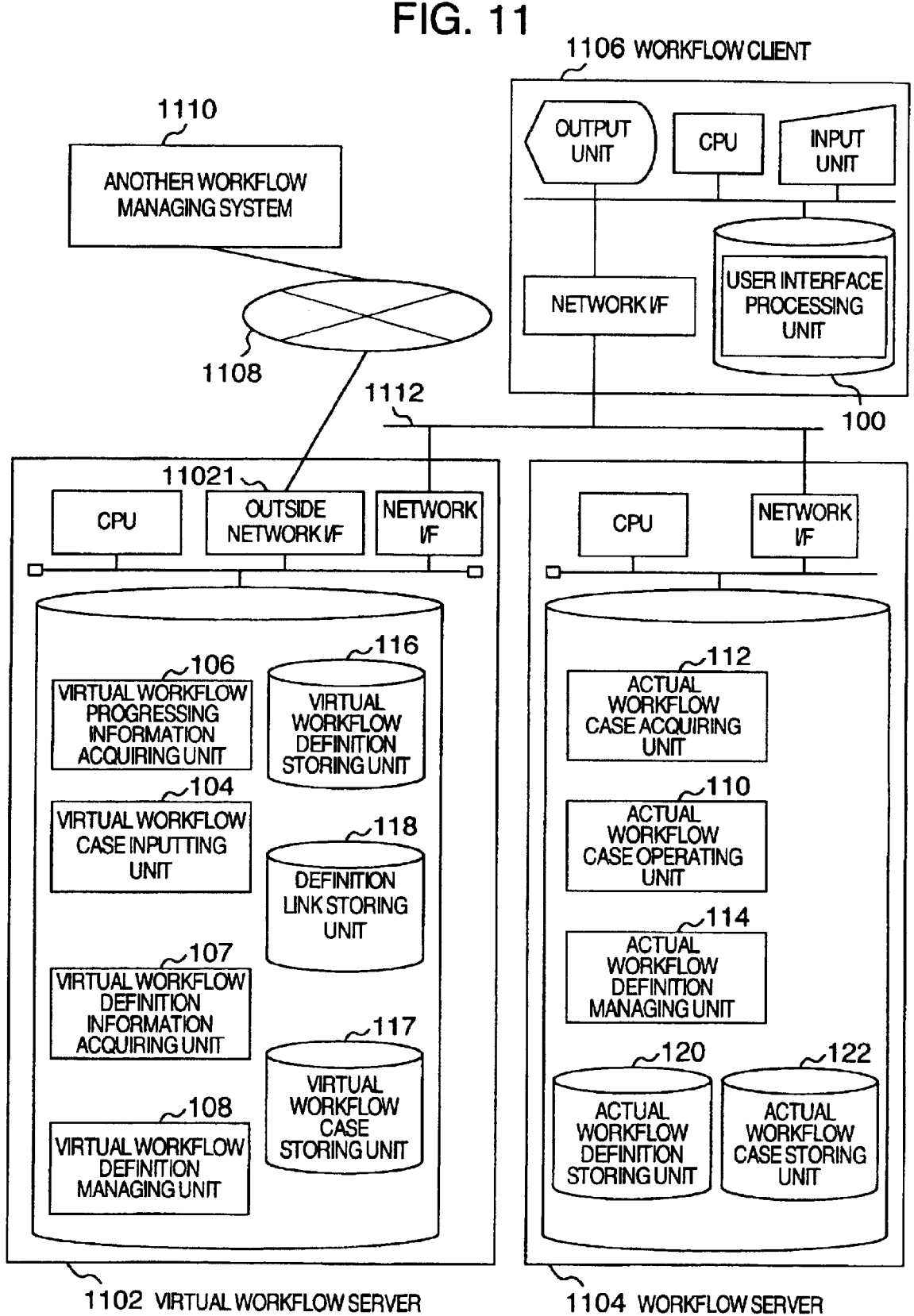
FIG. 11 is a schematic diagram showing a computer configuration to be applied to the workflow system according to the invention.

FIG. 11 illustrates the configuration of a computer embodying the present invention. A computer system to which the present invention applies is a client-server system in which the process of the invention is executed in the server in response to a request from the client. In this configuration, a virtual workflow server 1102, an actual workflow server 1104, and a workflow client 1106 are connected through a network interface and a LAN 1112. The system is connected to another workflow managing system 1110 through an external network interface 11021 and a WAN 1108. In this embodiment, the virtual workflow server 1102 includes a virtual workflow case inputting unit 104, a virtual workflow progress information acquiring unit 106, a virtual workflow case storing unit 117, and a definition link storing unit 118. The present invention is not limited to this configuration. In place, the same computer may be used for the virtual workflow server 1102 and the workflow server 1104. Further, the same computer may be used for the virtual workflow server 1102 and the workflow client 1106. Moreover, the network configuration between the computers may be different from the configuration shown in FIG. 11.

Figure 12A:
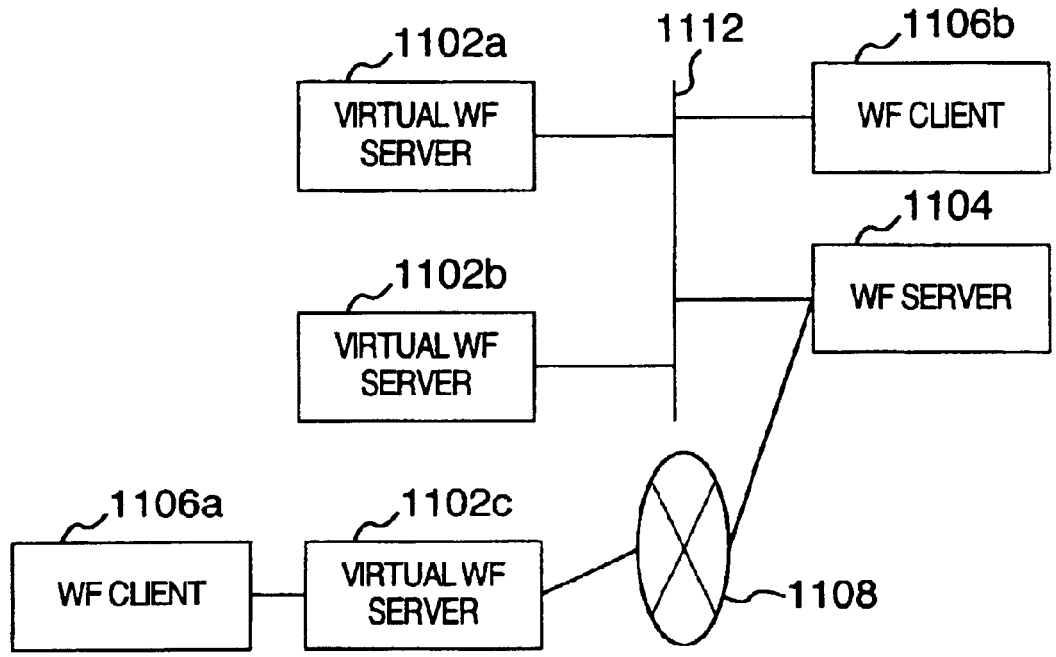
FIGS. 12A and 12B are schematic diagrams showing another computer configuration to be applied to the workflow system according to the invention.
Figure 12B:
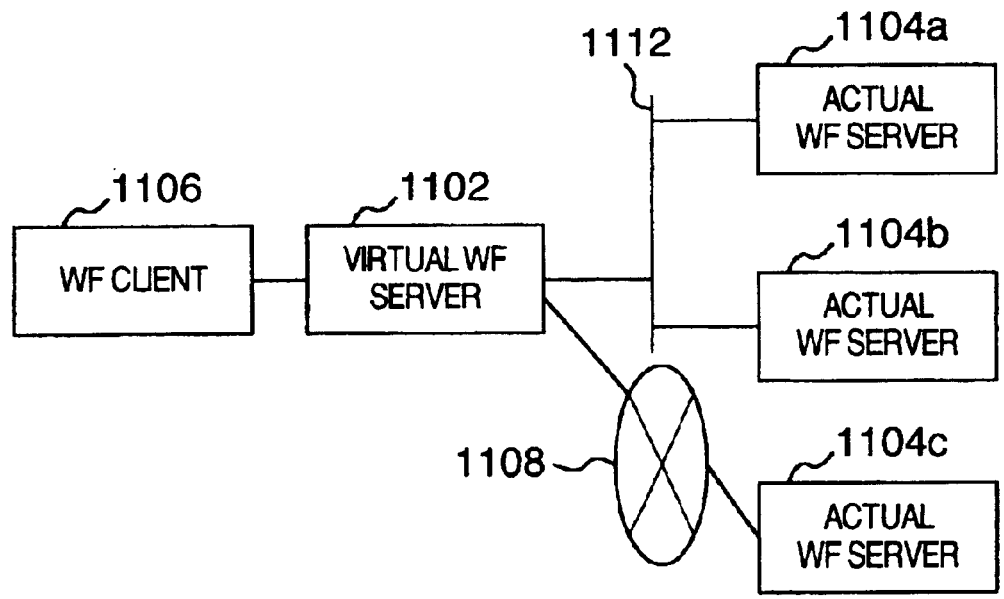

FIGS. 12A and 12B illustrate another computer configuration according to the invention. The configuration shown in FIG. 12A includes a plurality of workflow clients 1106a and 1106b, a plurality of virtual workflow servers (referred to as a virtual WF server) 1102a to 1102c, and one actual workflow server 1104. The preparation of the virtual WF servers makes it possible to provide the virtual workflow according to the restriction of the installation of the virtual WF server and the service content of the WF client connected to the virtual WF server. That is, the necessary number of definitions to the service content of a section served as the WF client and the network band between the virtual FW server and the actual WF server is made open from the actual WF server to the virtual WF server.

FIG. 12B illustrates a workflow system configured of a single workflow client 1106, a single virtual server 1102, and a plurality of actual workflow servers 1104a to 1104c. In the workflow system shown in FIG. 12B, though the single workflow client has been required to switchably use a plurality of actual workflow servers according to the content, the workflow client serves to represent a plurality of actual workflow servers through one virtual workflow by using the single virtual server and share the actual processes for the corresponding purposes of use.

(Storage of Definition Information)

Figure 3A:
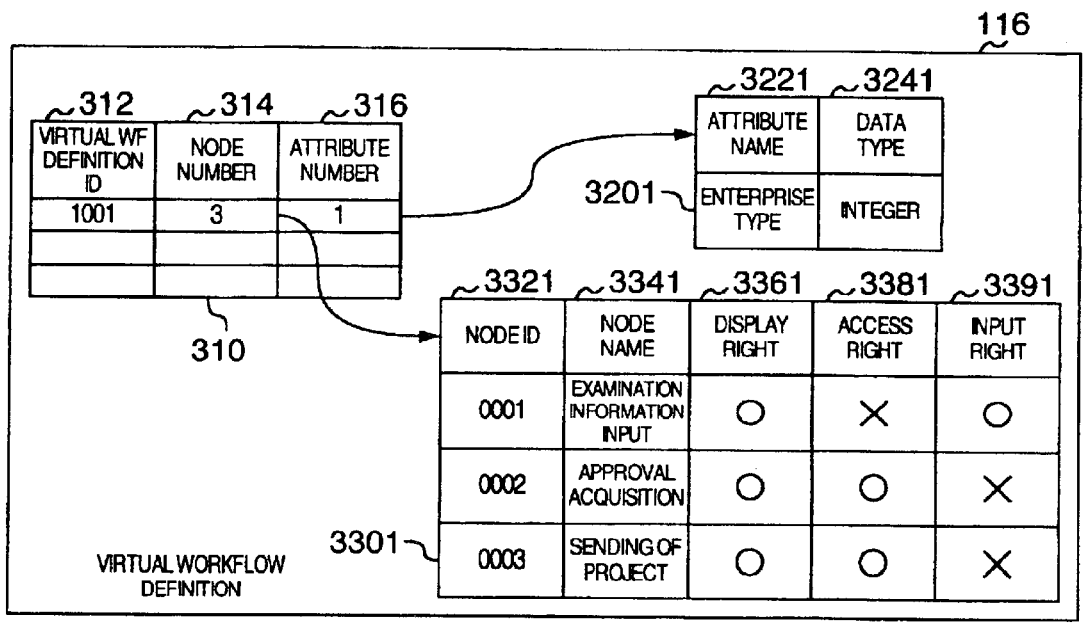
FIGS. 3A and 3B are schematic views showing a storage for virtual workflow definition information in the embodiment shown in FIG. 1.
Figure 3B:
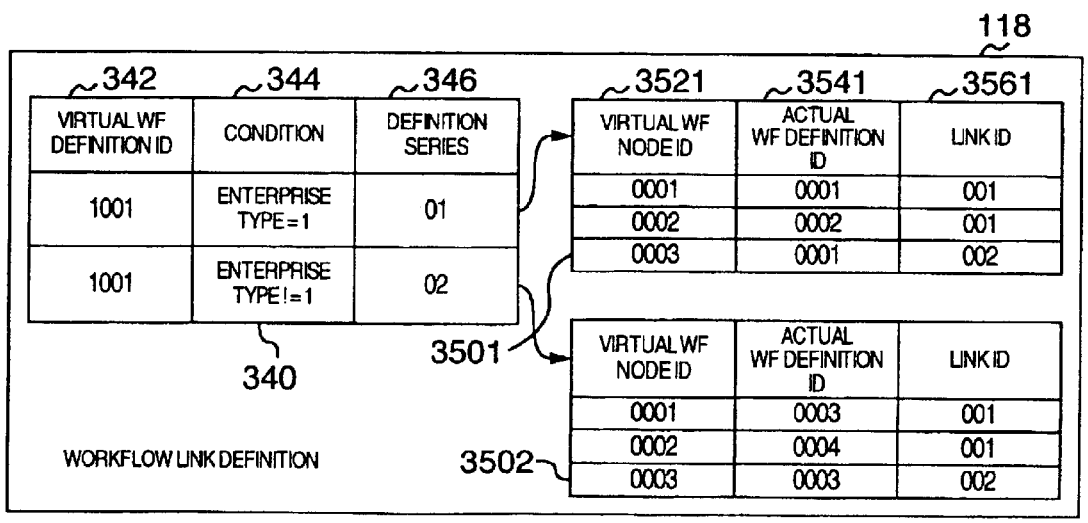
Figure 4:
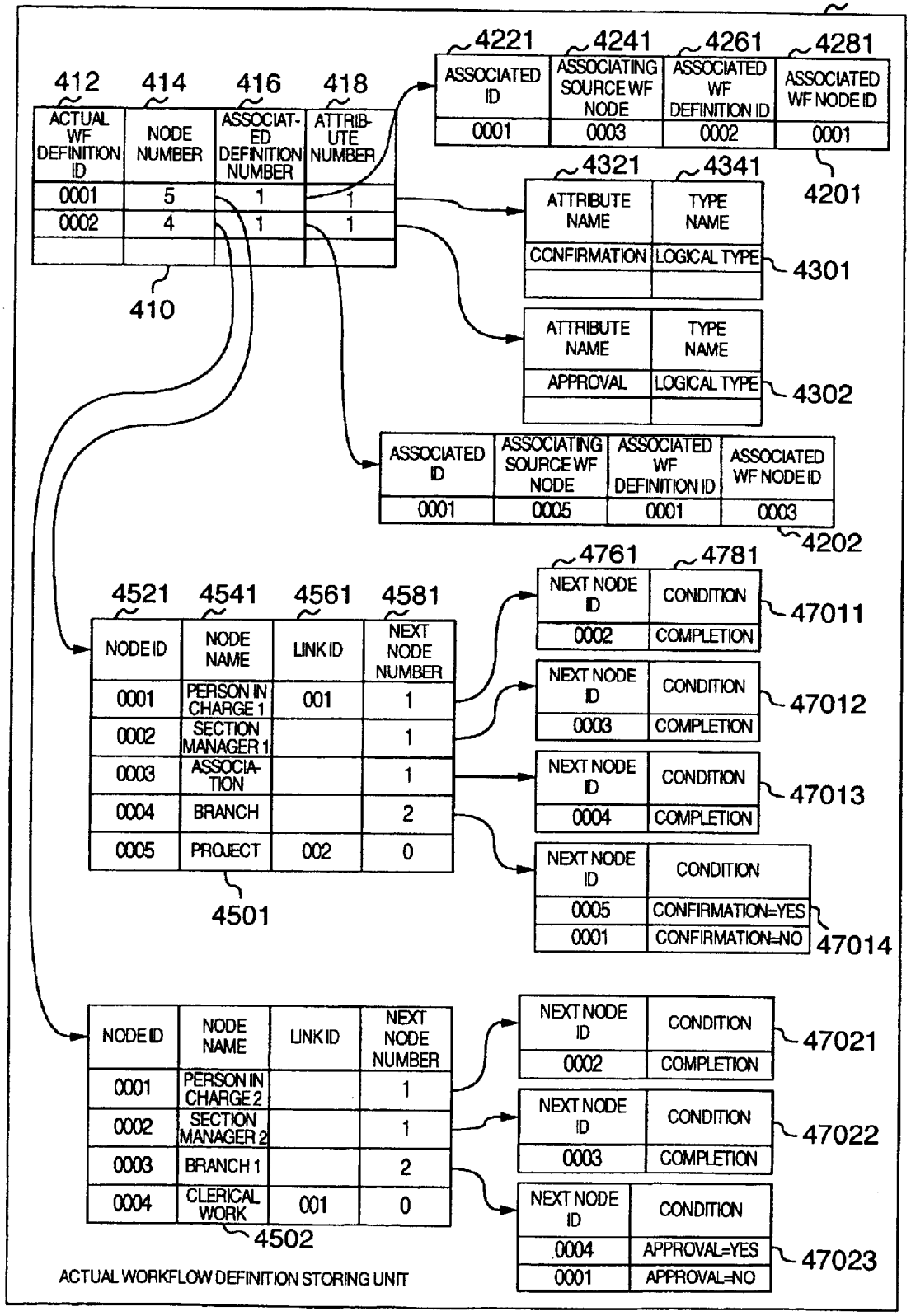
FIG. 4 is a schematic view showing a storage for actual workflow definition information in the embodiment shown in FIG. 1.

FIGS. 3A and 3B illustrate the storage example of the virtual workflow definition information. FIG. 4 illustrates the storage example of the actual workflow definition information. Then, the description will be oriented to how the execution information of the workflow definition shown in FIG. 2 is stored with reference to FIGS. 3A and 3B and FIG. 4.

As shown in FIG. 3A, the virtual workflow definition storing unit 116 is composed of a table 310 of the virtual workflow definition, a virtual attribute table 3201 for storing an attribute contained in the definition, and a virtual workflow node table 3301. The virtual workflow definition storing unit 116 operates to store the definition information of the virtual workflow definition managed by the virtual workflow system. The virtual attribute table 3201 and the virtual workflow node table 3301 serves to store the virtual attribute and the information of the virtual node defined by each virtual workflow definition. One virtual workflow definition corresponds to one virtual attribute table and one virtual workflow node table.

The virtual workflow definition table 310 is composed of a record having a field of a virtual workflow definition ID 312, a field of the number of nodes 314 in each virtual workflow definition, and a field of the number of attributes 316 in each virtual workflow definition.

The virtual workflow node table 3301 is composed of a record having a field of a node ID 3321, a field of a node name 3341, a field of a display right 3361, a field of an inquiry right 3381, and a field of an input right 3391, which compose a relevant virtual workflow definition. The display right 3361 stores the presence or the absence of the operation right of publication of the virtual workflow node to a user (client). The inquiry right 3381 stores the presence or the absence of the operation right of the inquiry on the progress of the node by the user. The input right 3391 stores the presence or the absence of the operation right of the execution information input at the node. The operation right is not limited to those rights. Another right may be set. One virtual workflow node table 3301 is located in one record of the virtual workflow definition table 310. The number of records of the virtual workflow node table 3301 corresponds to the number of the nodes 314 of the virtual workflow definition table 310.

A numeral 3201 denotes a virtual attribute table which is composed of a record having a field of an attribute name 3221 and a field of a data type 3241. The virtual attribute is information used for switching the actual workflow definitions according to the purpose of use. The virtual attribute is defined independently of the attribute of the actual workflow definition. In place, the virtual attribute may be commonly used by defining the attribute of the actual workflow as another name. One virtual attribute table 3201 is located in one record of the virtual workflow definition table 310. The number of the records of the virtual attribute table 3201 corresponds to the number of the attributes 316 in the virtual workflow definition table 310.

As shown in FIG. 3B, the definition link storing unit 118 is composed of a virtual definition series table 340 and virtual node link tables 3501 and 3502.

The virtual definition series table 340 is composed of a record having a field of a virtual workflow definition ID 342, a field of a condition 344 for executing the virtual workflow definition, and a field of a definition series 346. The definition series 346 is a field in which one corresponding pattern is specified if two or more actual workflow definitions being matched to the virtual workflow definition are provided according to the condition.

The virtual link table 3501 is composed of a record having a field of a virtual ID 3521, a field of an actual workflow definition ID 3541 having a node to be linked with the virtual node, and a field of a link ID 3561. One virtual node link table 3501 is located for each record of the virtual definition series table 340. This holds true to the arrangement of the virtual node link table 3502.

The number of the records of the virtual node link table corresponds to the number of the nodes 314 of the virtual workflow definition table 310.

As shown in FIG. 4, the actual workflow definition storing unit 120 is composed of an actual workflow definition storing table 4201 associated with the actual workflow definition table 410, actual attribute definition tables 4301 and 4302, actual workflow node tables 4501 and 4502, and actual workflow node transition information tables 47011 to 47014 and 47021 to 47023.

The actual workflow definition table 410 is composed of an actual workflow definition ID 412, the number of nodes 414 of the actual workflow definition, the number of the actual workflow definitions 416 being associated with the actual workflow definition, and the number of attributes 416 being used in the actual workflow definition. The associated workflow definition storing table 4201 includes the corresponding number of records to the associated definition number 416, one of those records being composed of an associated ID 422, a node ID 4241 in the source actual workflow definition, a destination actual workflow definition ID 4261, and a node ID 428 of the destination actual workflow definition.

The actual attribute definition table 4301 includes the corresponding number of records to the attribute number 418 of the table 410 generated therein. One of those records includes a field of an attribute name 432 and a field of an attribute type 434. This holds true to the arrangement of the actual attribute definition table 4302.

The actual workflow node table 4501 includes the corresponding number of records to the node number 414 of the actual workflow definition generated therein. One of those records is composed of a node ID 4521 for composing the actual workflow definition, a node name 4541, a link ID 4561 for matching the node to the node of the virtual workflow definition, and a next node number 4581. This holds true to the arrangement of the actual workflow node table 4502.

The actual workflow node transition information table 47011 includes the corresponding number of records to the next node number 458 generated therein. Each record includes a field of a next node ID 4761 and a field of a transition condition 4781. This holds true to the arrangements of the actual workflow node transition information table 47012 to 47014 and 47021 to 47023.

If the value of the link ID 3561 shown in FIG. 3B is equal to the value of the link ID 4561 shown in FIG. 4 in a record, it indicates that the virtual workflow definition for the record of the link ID 3561 corresponds to the actual workflow definition for the record of the link ID 4561.

(Storage Example of Input Information)

Figure 5A:
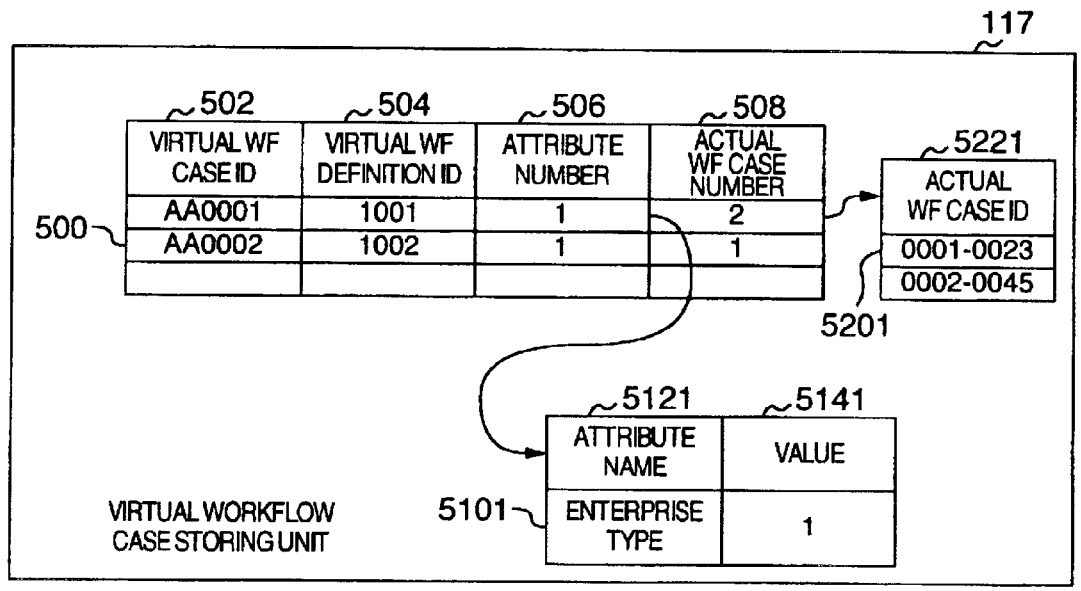
FIGS. 5A and 5B are schematic views showing an arrangement of a workflow case table.
Figure 5B:
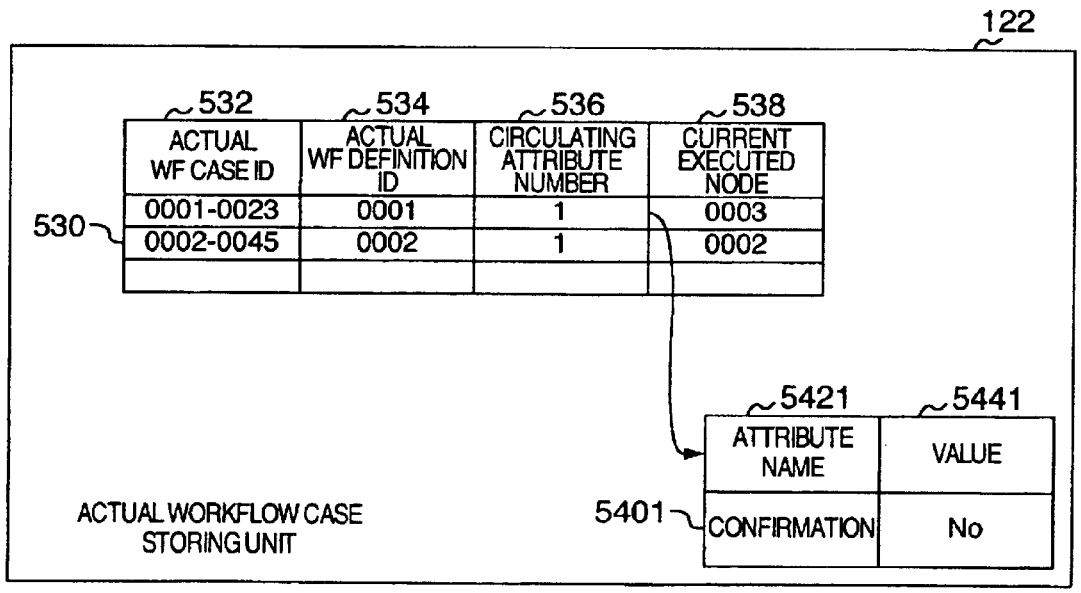

FIGS. 5A and 5B illustrate the workflow case table. FIG. 5A shows the table of the virtual workflow case storing unit 117, while FIG. 5B shows the table of the actual workflow case storing unit 122. The virtual workflow case storing unit 117 stores each case generated on the virtual workflow definition. The actual workflow case storing unit 122 stores the case of the actual workflow associated with the virtual workflow case.

The virtual workflow case storing unit 117 shown in FIG. 5A is composed of a virtual workflow case table 500, an actual workflow case ID table 5201, and a virtual workflow case attribute table 5101.

The virtual workflow case table 500 is composed of a virtual workflow case ID 502, a virtual workflow definition ID 504, an attribute number 506, and the corresponding actual workflow case unit number 508. The actual workflow case ID table 5021 includes the corresponding number of records to the execution unit number 508 of the actual workflow generated therein and stores the actual workflow case ID 5221. The virtual workflow case attribute table 5101 includes the corresponding number of records to the attribute number 506, each record being composed of an attribute name 5121 and an attribute value 5141.

The actual workflow case storing unit 122 shown in FIG. 5B is composed of an actual workflow case table 530 and an actual workflow case attribute table 5401.

The actual workflow case table 530 is composed of an actual workflow case ID 532, an actual workflow definition ID 534, a circulating attribute number 536 of the actual workflow case, and a current execution node 538. The actual workflow case attribute table 5401 includes the corresponding number of records to the circulating attribute number 536 generated therein, each of those records being composed of an attribute name 5421 and an attribute value 5441.

(Example of User Interface Processing)

FIG. 6 illustrates an example of user interface processing for an operator of a virtual workflow system or a user of a virtual client.

At first, at a step 602, the process is executed to display a list of functions to be executed by the virtual workflow system and wait for a selection of a function to be executed by the operator of the virtual workflow system or the user of the virtual client (step 604). The execution functions include a virtual workflow definition registration, a virtual workflow case input, and a virtual workflow progress information display. If the virtual workflow definition registration is selected, the operator of the virtual workflow system enters the node information and condition of the actual workflow to be linked with the virtual workflow (step 606) and then invoke the virtual workflow definition registration (step 10).

If the virtual workflow case input is selected, the process is executed to wait for an input of the virtual workflow definition ID by the user of the virtual client (step 612). Then, the corresponding definition information to the inputted ID is acquired from a group of tables (step 107). Then, the process is executed to display the necessary information to the input (step 616) and wait for the information input (step 618). If the information is inputted, the process of inputting the virtual workflow information is executed and then the virtual workflow definition and the link definition are created (step 106).

If the virtual workflow progress information display is selected, the process is executed to wait for the input of the virtual workflow case ID from the user of the virtual client (step 628). Then, the progress information is acquired by using the input ID (step 104). Then, the progress information is displayed on the screen (step 632).

In the foregoing processes, the process of registering the virtual workflow definition (108), the process of acquiring the virtual workflow definition information (107), the process of inputting the virtual workflow information (104), and the process of acquiring the progress information (106) will be described in detail. Those processes are the features of this embodiment.

(Virtual Workflow Definition Registration)

Figure 7:
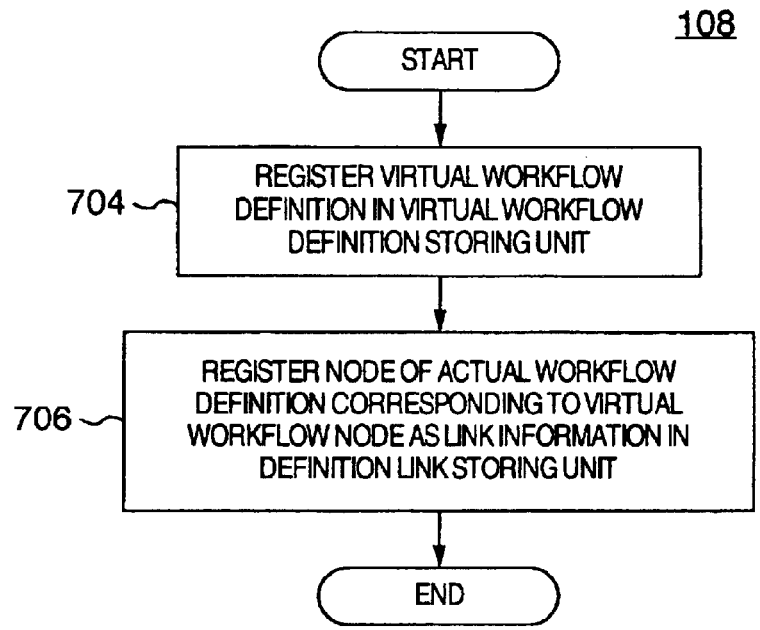
FIG. 7 is a flowchart showing an algorithm of a process (108) for registering the virtual workflow definition shown in FIG. 6.

FIG. 7 is a flowchart showing the process of registering the virtual workflow definition (108). This process is executed to allow the operator of the virtual workflow system to register a model virtual workflow definition to be opened to the user of the virtual client through the use of the information of the actual workflow definition.

The input information to be given for calling this process includes the node information of the actual workflow to be defined as a virtual workflow, a virtual node name in the virtual workflow of the node of the actual workflow, and an operation right obtained by the client of the virtual node.

When the process 108 is invoked, the virtual workflow definition is registered in the virtual workflow definition storing unit 116 through the use of the node information of the actual workflow definition, the name of the node in the virtual workflow, and the operation right, which are inputted at the step 606 (step 704). At first, the process is executed to determine one combination of an ID that is not overlapped with the virtual workflow definition ID having being registered and to register the ID, the number of the nodes to be defined, and an attribute number in the virtual workflow definition table 310. Next, the process is executed to generate the corresponding number of virtual workflow node table 3301 to the number of nodes and register the virtual node ID, the name of the node, and settings of various permissive rights to the node. Next, the process is executed to generate the corresponding number of virtual attribute tables 3201 to the attribute number and to register the name and the data type for each attribute.

Next, the process is executed to register the link information between the virtual workflow node and the node of the actual workflow definition corresponding to the virtual workflow node (step 706). That is, in correspondence with the virtual workflow definition ID and the virtual node ID given at the step 704, the combination of the ID of the actual workflow definition defined in the actual workflow definition storing unit 120 and the link ID of the node is registered in the virtual node link table 350. Depending on the attribute defined in the virtual attribute table 320, if the input information contains the condition for changing the actual node corresponding to the virtual node, the attribute condition 344 is stored in the virtual workflow definition series table 340 and the information is stored in the definition series 346. In each of the series, the link between the virtual node and the actual node is registered in the virtual node link tables 3501 and 3502.

Figure 14A:
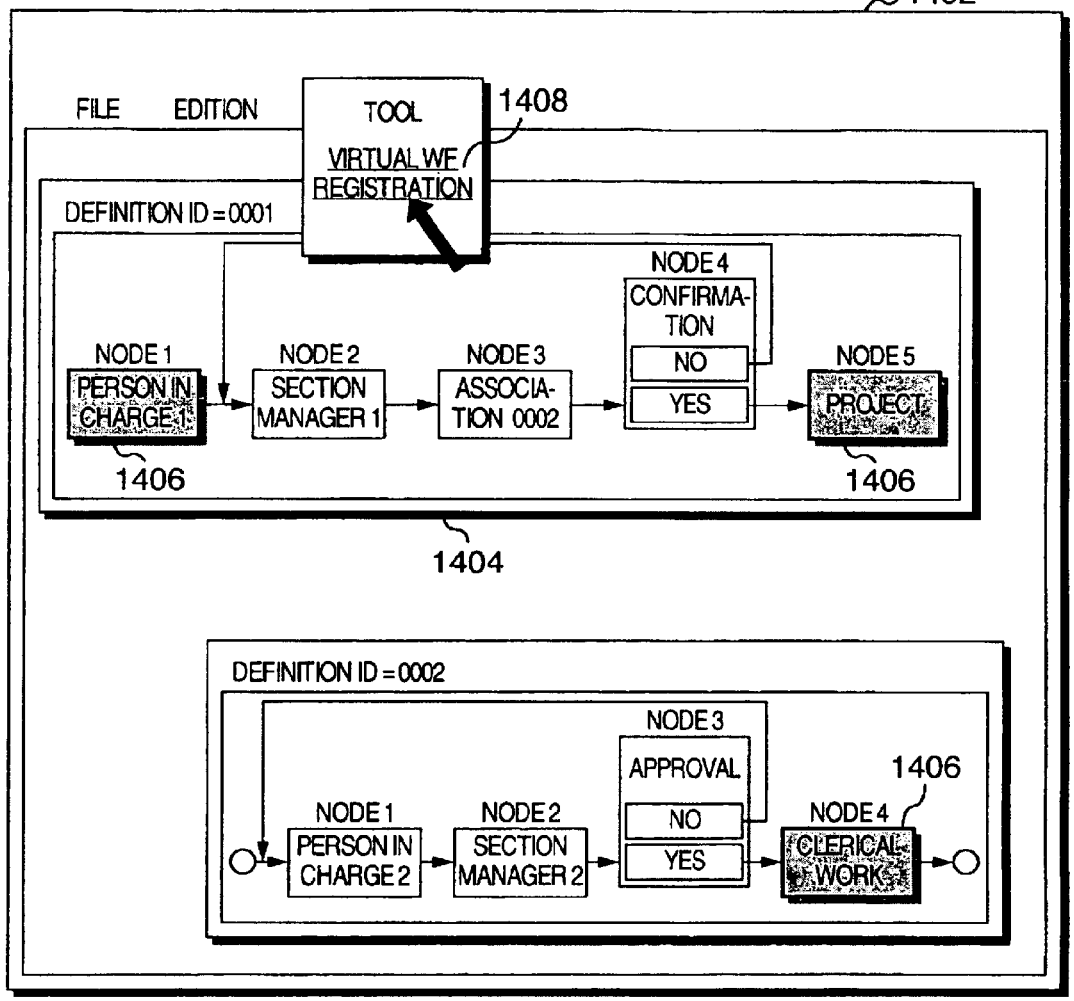
FIGS. 14A and 14B are schematic diagrams showing a screen for registering the virtual workflow definition.
Figure 14B:
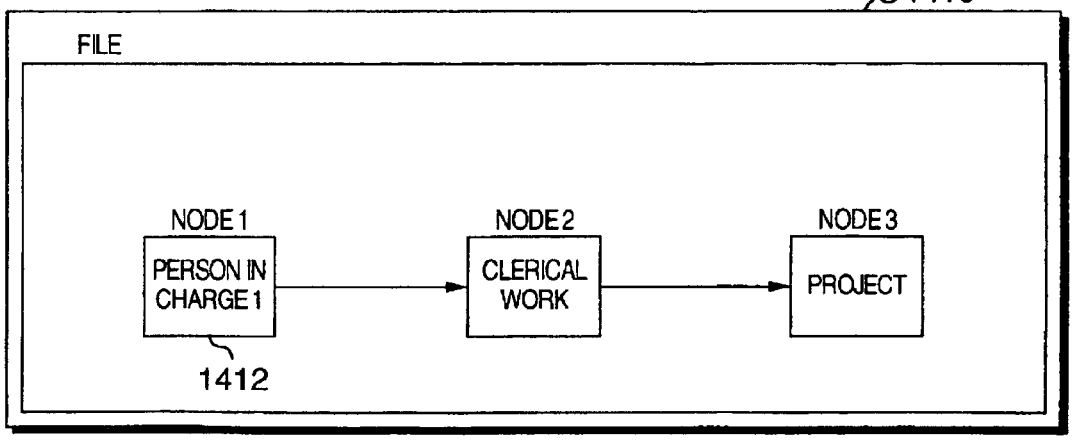

FIGS. 14A and 14B show one screen of a workflow client of the virtual workflow definition registration. FIG. 14A shows the screen specified at the step 606. The actual workflow definition required for registering the virtual workflow definition is invoked like the block 1404. The node to be registered as the node of the virtual workflow in the actual workflow definition is specified by shading 1406. By invoking the virtual workflow registering block 1408, the virtual workflow definition 1410 shown in FIG. 14B is generated.

(Virtual Workflow Definition Information Acquisition)

Figure 8:
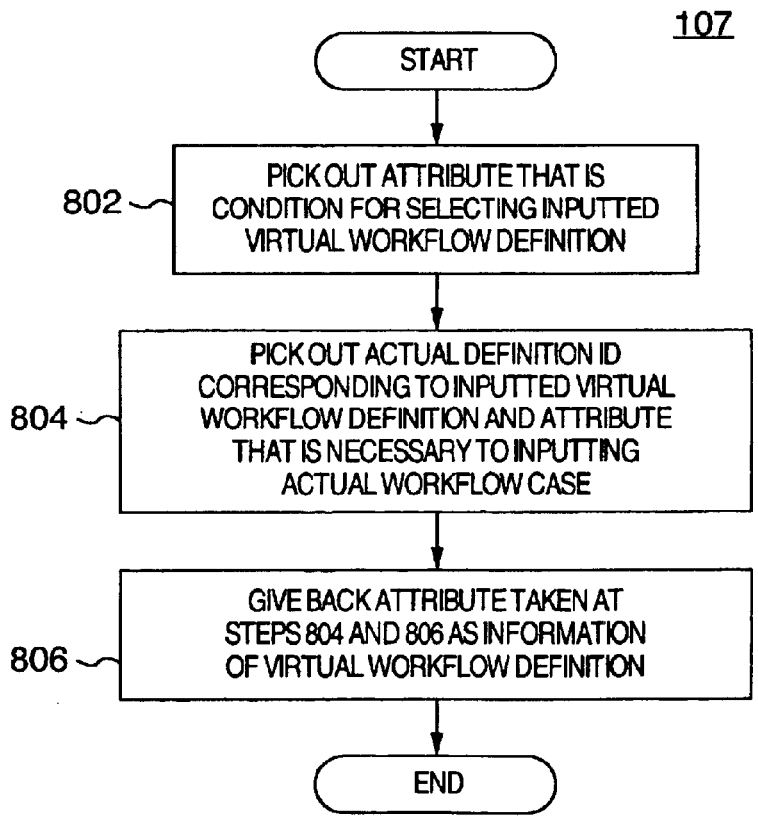
FIG. 8 is a flowchart showing an algorithm of a process (107) for obtaining the virtual workflow definition information shown in FIG. 6.

FIG. 8 shows the routine of the process of acquiring the virtual workflow definition information (107). This process is executed to allow the virtual workflow system to acquire the information required when the user of the workflow client inputs the case by using the virtual workflow definition.

This process is invoked by the ID of the virtual workflow definition from the user of the workflow client. The processing unit operates to pick out the attribute that means the condition of the definition corresponding to the inputted virtual workflow definition (step 802). The virtual attribute corresponding to the definition ID is taken out of the virtual workflow definition table 310 and the virtual attribute table 3201.

Then, the process is executed to take out the actual workflow definition corresponding to the virtual workflow definition and the attribute required for inputting the actual workflow case (step 804). It is possible to take out the necessary attribute from the virtual workflow definition series table 340, the virtual node link tables 3501 and 3502, the workflow definition table 410, and the attribute definition tables 4301 and 4302. Next, the attributes taken out at the steps 802 and 804 are given back as the information of the virtual workflow definition to the user of the workflow client (step 806).

The foregoing process makes it possible for the user of the workflow client to acquire the necessary attribute as the virtual workflow definition information. If the content of the actual workflow definition is changed, this process makes it possible to obtain the set attribute according to the changed content of the actual workflow definition without changing the virtual workflow definition. This results in reducing the maintenance steps of the workflow definition to be executed by the operator of the virtual workflow system.

(Virtual Workflow Information Input)

Figure 9:
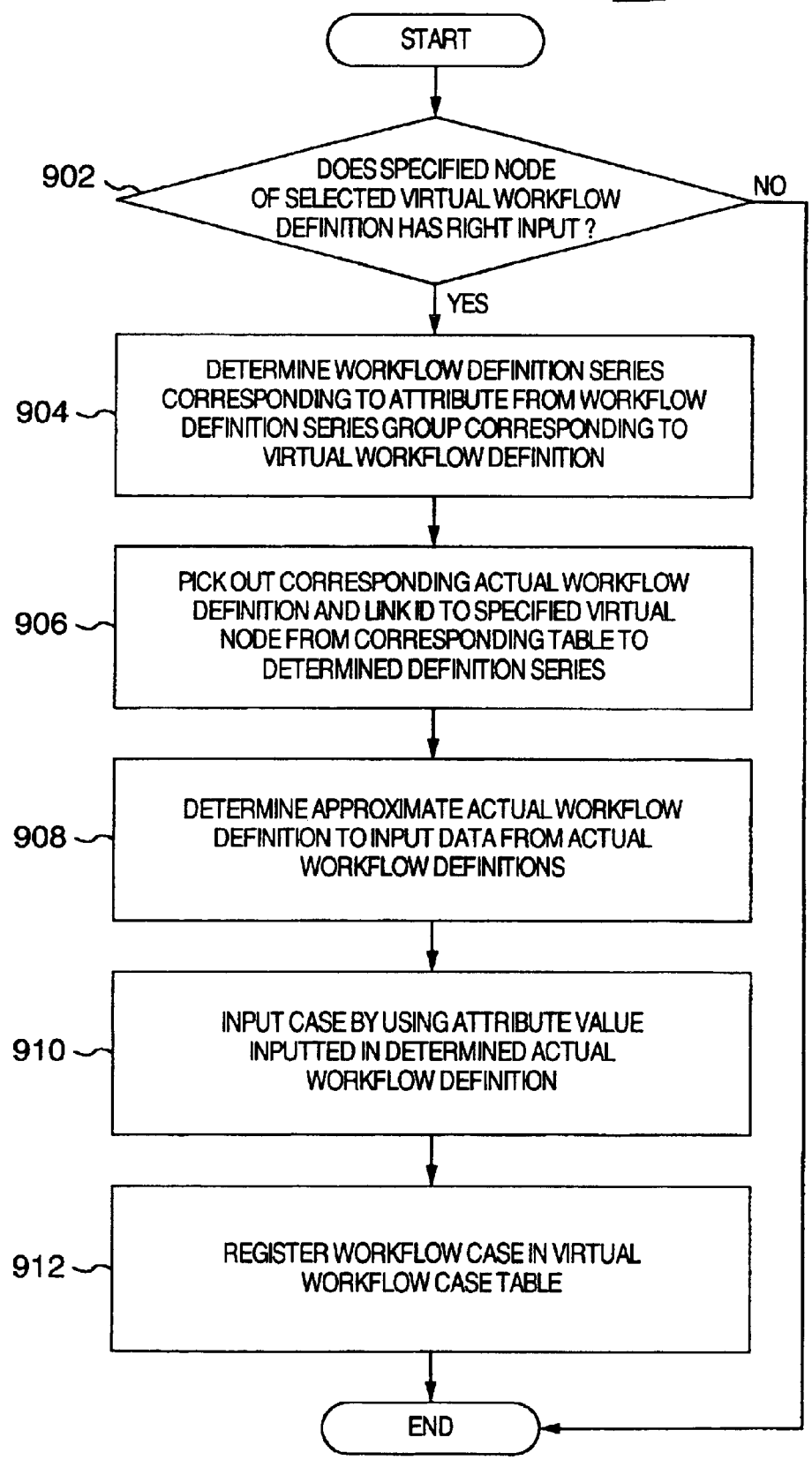
FIG. 9 is a flowchart showing an algorithm of a process (106) of inputting the virtual workflow information shown in FIG. 6.

FIG. 9 shows the routine of the process of inputting the virtual workflow information (106). This process allows the user of the virtual client to input the virtual workflow case.

This process is invoked by inputting an ID of the virtual flow definition, a virtual node, and an attribute value to be set. If the virtual node to be inputted is not a head node, the workflow case ID is also made to be the input information. After the process is invoked, the processing unit operates to determine if the specified node of the virtual workflow definition selected by a person who inputted the data has a right of input (step 902). It is checked if the node has a right of input from the right of input 3391 provided in the virtual workflow node table 3301.

Next, the definition series to be used are determined from the virtual workflow attribute value to be set (step 904). By applying a virtual attribute value to the condition 344 of the virtual workflow definition series table 340, the definition series 346 to be used may be determined.

Next, the process is executed to take out the corresponding actual workflow definition ID 3541 and link ID 3561 to the virtual node specified by inputting the data from the corresponding virtual node link table 3501 or 3502 to the definition series (step 906).

Then, the process is executed to determine the corresponding actual workflow definition record to the actual workflow definition ID specified at the step 906 from the actual workflow definition table 410 (step 908).

Next, the user of the workflow client operates to enter the case by using the attribute value inputted to the determined actual workflow definition record (step 910). The entry of the workflow case is executed by the workflow case operating unit 110 in the virtual workflow system and then is stored in the workflow case storing unit 122.

Then, the execution information is registered in the virtual workflow case storing unit 117 (step 912). Next, the process is executed to determine the virtual workflow case ID that is not overlapped with the pre-registered virtual workflow case ID and then register the virtual workflow definition ID, the attribute number, the actual workflow case unit number, and the corresponding workflow case ID in the virtual workflow case table 500. Further, the process is also executed to generate the corresponding virtual workflow case attribute table 5101 to the attribute number and set the virtual workflow attribute name and value that are input information. Moreover, the corresponding actual workflow case ID is set in the actual workflow case ID table 5201. If the virtual workflow case ID is the input information, the number of the actual workflow cases of the inputted virtual workflow case ID is increased by 1 and the actual workflow case ID is added to the corresponding actual case ID table 5201.

The foregoing process makes it possible to do an input of the virtual workflow case. The combination of this process and the process of acquiring the virtual workflow definition information makes it possible to do the input process according to the changed content of the actual workflow definition without changing the virtual workflow definition even if the content of the actual workflow definition is changed. This results in decreasing the maintenance steps of the workflow definition to be done by the operator in the virtual workflow system.

(Progress Information Acquisition)

Figure 10:
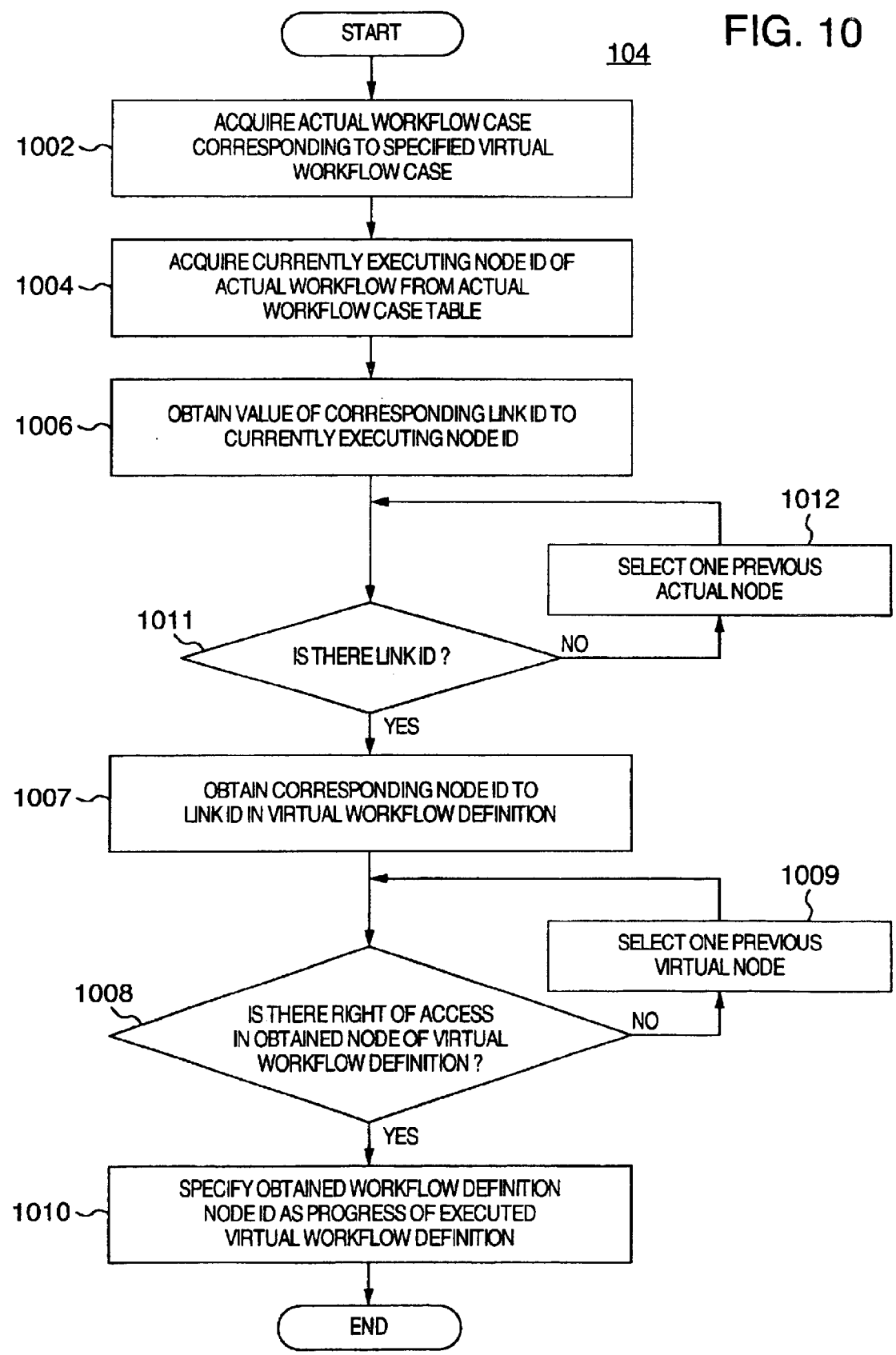
FIG. 10 is a flowchart showing an algorithm of a process of obtaining the progress information of the virtual workflow shown in FIG. 6.

FIG. 10 shows a routine of a process of acquiring a virtual workflow progress information 104. This process makes it possible to acquire the information about how far the inputted virtual workflow has been processed and then to display the information to the user of the virtual client.

This process is invoked by inputting the virtual workflow case ID. This processing unit operates to acquire the corresponding actual workflow case ID 522 to the specified virtual workflow case ID 5021 from the virtual workflow case table 500 and the actual workflow case ID table 5201 (step 1002).

Next, the process is executed to acquire the current execution node 538 for representing the execution state of the actual workflow and the actual workflow definition ID 534 from the actual workflow case table 530 (step 1004).

Then, the process is executed to obtain a workflow node table 4501 corresponding to the actual workflow definition ID 412 acquired from the actual workflow definition table 410 and then obtain the value of the corresponding link ID to the node ID (herein, "0003") matched to the current execution node (step 1006). In this embodiment, if no link ID is set, the process is executed to check if there is provided a link ID of the node (herein, "0002") of one previous record of the workflow node table 450 and is repeated until the node (herein, "0001") where the value is set.

Then, the process is executed to obtain the corresponding virtual node ID to the obtained link ID from the virtual node link table 3501 by using the actual workflow definition ID and the link ID (step 1007). If two or more actual workflows correspond to the virtual workflow, the two or more virtual nodes are provided accordingly. In actual, the largest value of the virtual workflow node IDs is obtained.

Next, it is checked if the corresponding virtual node to the obtained node has an access right to the progress information (step 1008). If no access right is provided, one more previous virtual node is checked (step 1009). If the virtual node has an access right, the obtained virtual workflow node ID is made to be the progressing state that is the processed result (step-1010).

As set forth above, the process of acquiring the progress of the virtual workflow case is executed. This process makes it possible to display the progressing state of the virtual workflow on the assumption that only the node of the actual workflow definition for requiring the progress information is defined as the node of the virtual workflow definition. This results in making it possible to notify the other party of the genuinely necessary progress as protecting the in-company procedure information to the other party from being leaked out.

(Another Virtual Workflow Definition)

Further, the present invention is not limited to the foregoing embodiment. One actual workflow may be represented as two or more virtual workflows.

Figures 13A, 13B:
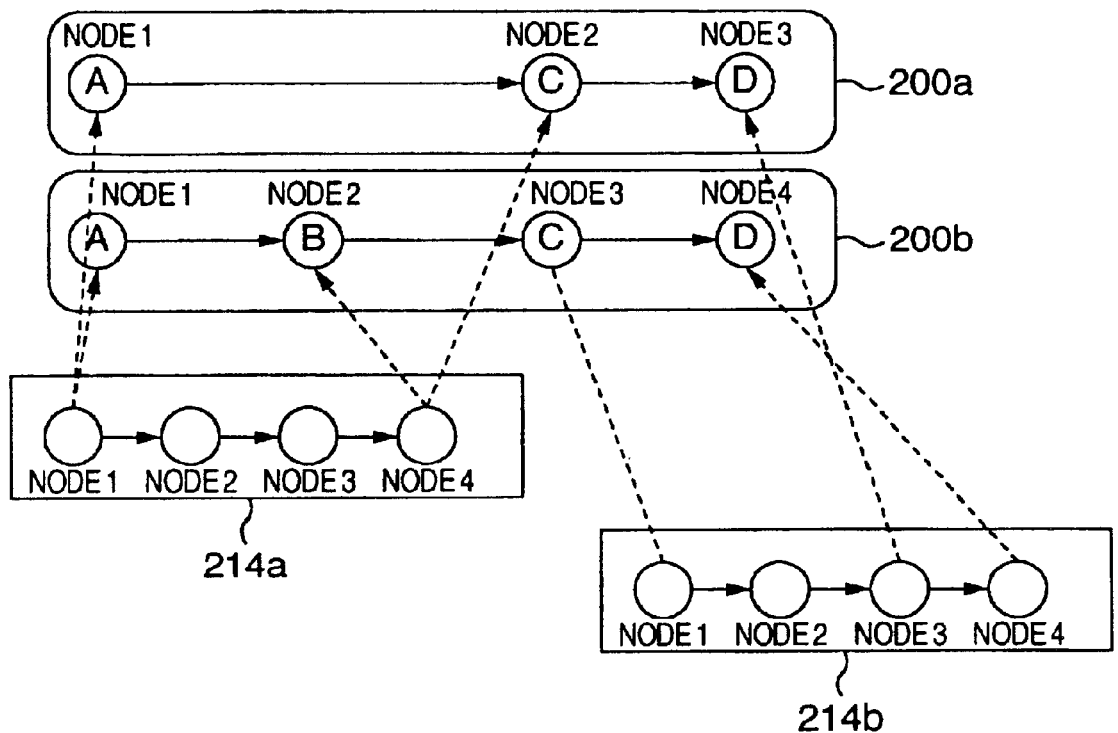
FIGS. 13A and 13B are schematic diagrams showing another virtual workflow definition in the workflow system according to the invention.

FIG. 2 shows the embodiment in which one virtual workflow is registered in the case of associating two or more actual workflow definitions with one another, while FIG. 13A shows the data example in which two or more virtual workflow definitions are provided.

FIG. 13A shows the example of the virtual workflow definition. As shown, a virtual workflow 200a is composed of the nodes of an actual workflow 214a and a virtual workflow 200b is composed of the nodes of an actual workflow 214b. In this invention, a plurality of virtual workflow definitions are registered so that those definitions may be selected according to the condition. This makes it possible to show one actual workflow definition as a different workflow according to the condition. FIG. 13B shows a table 1302 in which the correspondence between the user ID 1304 for distinguishing the customer and the corresponding virtual workflow definition ID 1306 is defined. This embodiment is implemented by adding the user ID as input information when inputting the execution information of the virtual workflow.

FIG. 15 shows the transformation 1071 of the process of acquiring the virtual workflow definition information (107) included in the embodiment shown in FIGS. 13A and 13B. This process is invoked by the user ID of the user for entering the virtual workflow case. The processing unit operates to acquire the corresponding virtual workflow definition ID to the inputted user ID from the table 1302 (step 1501). The later processing is likewise to the process in FIG. 8.

What is claimed is:

1. A method for managing a plurality of actual execution workflows, each thereof, expressed by electronic data, for executing a flow of work, said actual execution workflows each including a plurality of nodes, comprising the steps of:

a processor unit for generating at least one virtual workflow, expressed by electronic data, including a plurality of nodes, on the basis of selected nodes of said actual execution workflows, said selected nodes being selected by first users of said actual execution workflows and permitted to be disclosed to a second user of said virtual workflow;

linking at least one process node of each of said actual execution workflows with a node of said virtual workflow, a process state of said process node thus linked being permitted to be disclosed to the second user of said virtual workflow;

specifying a node of said virtual workflow;

acquiring a node of said actual execution workflows linked with the node thus specified; and outputting a progress state of the acquired node as a progress state of the specified node of said virtual workflow.

2. The method as claimed in claim 1, further comprising the steps of:

setting a user's privilege of operation at each node of said virtual workflow; and registering the user's privilege of operation thus set in a virtual workflow definition for defining said virtual workflow.

3. The method as claimed in claim 1, further comprising the steps of:

determining an actual execution workflow definition for defining said actual execution workflows by using an attribute of a virtual workflow definition for defining said virtual workflow; and inputting execution information of said actual execution workflows by using the actual execution workflow definition thus determined.

4. The method as claimed in claim 1, further comprising the steps of:

if a privilege of reference to the acquired node is not permitted to a user requesting the progress state of the specified node, searching the nodes of said actual execution workflows for a previous node closest to the acquired node and having a privilege of reference permitted to the user; and outputting a progress state of the previous node as a progress state of the specified node of said virtual workflow.

5. The method as claimed in claim 1, wherein there are a plurality of virtual workflow definitions for defining said virtual workflow, said method further comprising the steps of:

inputting information for selecting virtual workflow definition; and determining a virtual workflow definition on the basis of said input information.

6. A virtual workflow managing system for managing a plurality of actual execution workflows, each thereof, expressed by electronic data, for executing a flow of work, accessing an actual execution workflow definition for defining said actual execution workflows, said actual execution workflows each including a plurality of nodes, respectively, comprising:

generating at least one virtual workflow, expressed by electronic data, including a plurality of nodes, on the basis of selected nodes of said actual execution workflows, said selected nodes being selected by first users of said actual execution workflows and permitted to be disclosed to a second user of said virtual workflow;

a storage unit for storing said actual execution workflow definition containing an ID of said actual execution workflows and an ID of each of said nodes contained in said actual execution workflow;

a storage unit for storing virtual workflow definition containing an ID of said virtual workflow, an ID of each of said nodes contained in said virtual workflow and access privilege information given to a user using said virtual workflow definition at each node of said virtual workflow; and a workflow link definition storage unit for storing an ID of a link linking an ID of a node of said virtual workflow with an ID of a corresponding node selected from said actual execution workflows.

7. In a workflow system having a client and a server, a method for managing a plurality of actual execution workflows, each thereof, expressed by electronic data, for executing a flow of work, said actual execution workflows each including a plurality of nodes, said method comprising the steps of:

generating at least one virtual workflow, expressed by electronic data, including a plurality of nodes, on the basis of selected nodes of said actual execution workflows, said selected nodes being selected by first users of said actual execution workflows and permitted to be disclosed to a second user of said virtual workflow;

holding a virtual workflow definition for defining nodes of said virtual workflow according to purpose of use by said client, an actual execution workflow definition for defining processing nodes of said actual execution workflows and a workflow link definition for linking said virtual workflow definition of nodes of said virtual workflow with said actual workflow definitions of selected nodes of said actual execution workflows, on the basis of an indication given from said client;

searching a node of said actual execution workflows corresponding to a node of said virtual workflow specified by said client, based on said workflow link definition; and outputting a progress state of said searched node of said actual execution workflows as a progress state of said specified node of said virtual workflow to said client.

8. The method as claimed in claim 7, wherein said virtual workflow definition holds information about a type of a privilege of operation by said client to said actual workflow definition at each node of said virtual workflow, said type being at least one privilege selected from a display privilege, a reference privilege and an input privilege.

9. The method as claimed in claim 7, wherein each of said nodes contained in said virtual workflow definition is linked with a node selected from a plurality of actual workflow definitions.

10. In a system having a client and a server, and for managing a plurality of actual execution workflows, each thereof, expressed by electronic data, for executing a flow of work, said actual execution workflow each including a plurality of nodes, said server comprising:

means for generating at least one virtual workflow, expressed by electronic data, including a plurality of nodes, on the basis of selected nodes of said actual execution workflows, said selected nodes being selected by first users of said actual execution workflows and permitted to be disclosed to a second user of said virtual workflow;

an information storage unit for storing a virtual workflow definition for defining nodes of said virtual workflow according to a purpose of use by said client, an actual workflow definition for defining processing nodes of said actual execution workflows and a workflow link definition for linking said virtual workflow definition of nodes of said virtual workflow with said actual workflow definition of selected nodes of said actual execution workflows;

a processing unit for searching a node of said actual execution workflows corresponding to a node of said virtual workflow specified by said client, based on said workflow link definition; and a processing unit for outputting a progress state of said searched node of said actual execution workflows as a progress state of said specified node of said virtual workflow to said client.

11. In a storage medium readable by a computer for storing a program of a method for managing a plurality of actual execution workflows, each thereof, expressed by electronic data, for executing a flow of work, executed by a sever in a workflow system having a client and said server, said actual execution workflows each including a plurality of nodes, respectively, said method comprising the steps of:

generating at least one virtual workflow, expressed by electronic data, including a plurality of nodes, on the basis of selected nodes of said actual execution workflows, said selected nodes being selected by first users of said actual execution workflows and permitted to be disclosed to a second user of said virtual workflow;

holding a virtual workflow definition for defining nodes of said virtual workflow according to a purpose of use by said client, an actual execution workflow definition for defining processing nodes of said actual execution workflows and a workflow link definition for linking said virtual workflow definition of nodes of said virtual workflow with said actual workflow definition of selected nodes of said actual execution workflows, based on an indication given from said client;

searching a node of said actual execution workflows corresponding to a node of said virtual workflow specified by said client, based on said workflow link definition; and outputting a progress state of said searched node of said actual execution workflows as a progress state of said specified node of said virtual workflow to said client.

* * * * *